W. W. S. Orbeton.
Shutter Support.
N° 67,999. Patented Aug. 20, 1867.
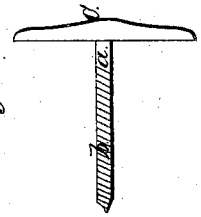
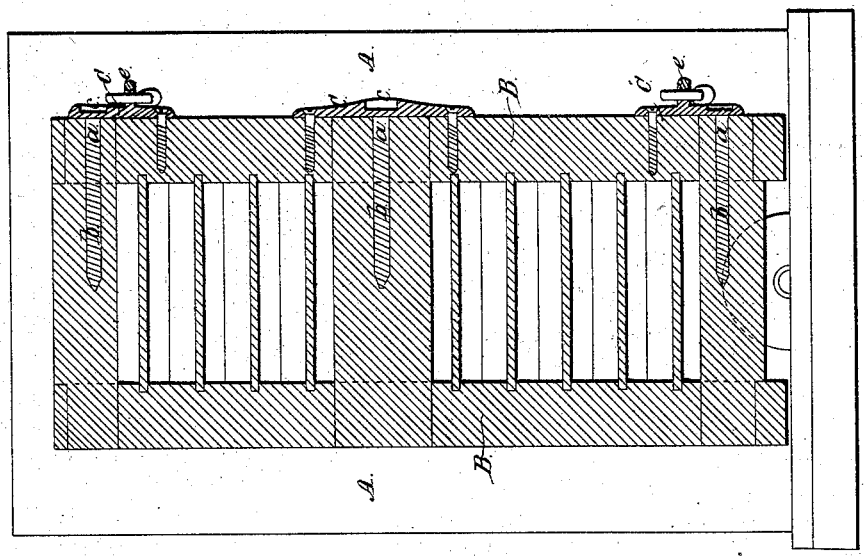
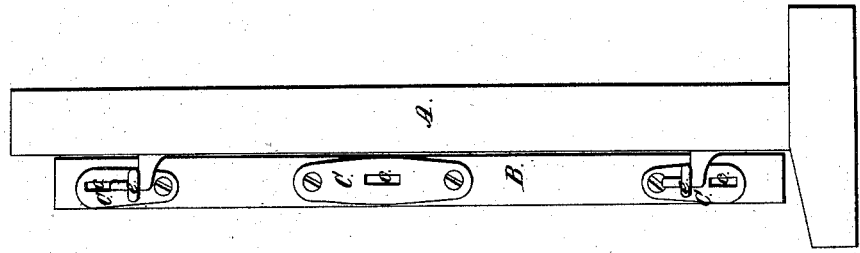
Witnesses.
J. E. Burnham
J. W. Bennett
Inventor:
W. W. S. Orbeton

United States Patent Office.

WILLIAM W. S. ORBETON, OF HAVERHILL, MASSACHUSETTS.

Letters Patent No. 67,999, dated August 20, 1867.

IMPROVED HINGE AND BLIND-SUPPORTER.

*The Schedule referred to in these Letters Patent and making part of the same.*

TO ALL PERSONS TO WHOM THESE PRESENTS SHALL COME:

Be it known that I, WILLIAM W. S. ORBETON, of Haverhill, in the county of Essex, and State of Massachusetts, have invented a new and useful Blind-Supporter; and I do hereby declare the same to be fully described in the following specification, and represented in the accompanying drawings, of which—

Figure 1 represents an end view of a frame and window-blind having my invention applied to the latter.

Figure 2 is a longitudinal and vertical section taken through the supporters and hinges.

Figure 3 is a side view of the supporter, and

Figure 4 is a top view of it as furnished with an eye.

In the said drawings, A denotes a window-frame, and B a window-blind, as provided with my invention, which consists in an improved device to be applied to heavy blinds, to hold the parts firmly together and prevent sagging thereof.

In constructing my improved blind-supporter, I make the same of iron, and form the body portion $a$ thereof of a cylindrical shape, and with its front or entering end of a tapering or frusto-conical shape. The said body portion is to be of any desirable diameter and length, one-half an inch in diameter and six inches in length being sufficient for an ordinary blind. I make on the said body part $a$ a male screw, $b$, which extends nearly its whole length, as seen in figs. 2 and 3. On the upper end of the said body portion, and at a right angle to the axis thereof, I form an elongated head or plate C, whose inner surface is flat, in order to fit closely to the blind-frame. In the outer face of the head or plate C, and in a line passing axially through the said part $a$, I make a shallow elongated slot or recess, $c$, the same being to enable a screw-driver to be applied to it in order to screw the part $a$ of the supporter into a hole made for its reception in the blind. The said plate C may extend an equal distance in each direction from the part $a$, or its two portions may be of unequal length, as shown in fig. 1; and, furthermore, such plate may be provided with one or more holes going transversely through it, in which one or more screws may be inserted, to securely fit the plate in its true position, although I do not deem such indispensable. When desirable, the said plate C may constitute one of the leaves of a hinge, by suitably affixing thereto, and so as to extend at a right angle therefrom, a metallic eye $e$, the same being in order to receive the pintle or journal of the hinge, as shown in figs. 1, 2, and 4.

In applying my invention to a window-blind, a hole is to be bored in one of the cross-bars or other suitable part of the blind, of a diameter about equal to that of the part to enter such hole, the depth of such hole to be about equal to the length of the said entering part $a$. The front end of the part $a$ is next to be inserted in the said hole, and, by means of a screw-driver or other suitable implement inserted in the slot $c$, the said part $a$ is to be screwed into the hole until the inner face of the plate B is brought into close contact with the frame of the blind. The number of supporters to be applied to an ordinary window-blind is two; but in case the blind is large and heavy, three or more may be employed.

By my peculiar construction and application of the blind-supporter, I so bind together and strengthen the parts of the blind as to completely prevent the sagging thereof. Besides, it can be cheaply constructed, and is very durable; and, moreover, when provided with an eye, as hereinbefore explained, it, in conjunction therewith, forms a valuable part of a hinge.

I do not claim a "lag-screw," as I am aware that such is very old, and differs materially from my invention; but having described my invention, what I claim, and desire to secure by Letters Patent, is as follows:

The said blind-supporter, made substantially as described, as a new article of manufacture.

W. W. S. ORBETON.

Witnesses.
T. E. BURNHAM,
J. W. BENNETT.